United States Patent [19]

Bornand

[11] Patent Number: 5,721,713
[45] Date of Patent: Feb. 24, 1998

[54] WATCH COMPRISING AN ARRANGEMENT FOR INDICATING A PREDETERMINED GEOGRAPHIC LOCALITY

[75] Inventor: Etienne Bornand, Boudry, Switzerland

[73] Assignee: Asulab S.A., Bienne, Switzerland

[21] Appl. No.: 576,409

[22] Filed: Dec. 21, 1995

[30] Foreign Application Priority Data

Jan. 4, 1995 [CH] Switzerland ............ 00 008/95

[51] Int. Cl.$^6$ ................................ G04B 47/00
[52] U.S. Cl. ........................................ 368/10
[58] Field of Search ............................ 368/10, 11

[56] References Cited

U.S. PATENT DOCUMENTS

| 4,372,052 | 2/1983 | Wakim ............... | 33/349 |
| 4,512,667 | 4/1985 | Doulton et al. ....... | 368/10 |
| 5,175,936 | 1/1993 | Sato .................. | 368/10 |

FOREIGN PATENT DOCUMENTS

| 154096 | 9/1985 | European Pat. Off. . |
| 165381 | 12/1985 | European Pat. Off. . |
| 2681159 | 3/1993 | France . |
| 678359 | 8/1991 | Switzerland . |
| 2151790 | 7/1985 | United Kingdom . |

OTHER PUBLICATIONS

Patent Abstracts of Japan, vol. 5, No. 175 (P-88) (847) Nov. 11, 1981 & JP-A-56 103 389 (Kabushiki Kaisha Daini Seikosha), Aug. 18, 1981.

*Primary Examiner*—Bernard Roskoski
*Attorney, Agent, or Firm*—Sughrue, Mion, Zinn, Macpeak & Seas, PLLC

[57] ABSTRACT

A watch for indicating the direction of a predetermined locality from a plurality of defined geographic regions. Such watch comprises an arrangement (28, 40) for detecting the direction of terrestrial magnetic north and means (22, 46, 14) for indicating the direction of a predetermined locality from any geographic region whatsoever comprised within a plurality of defined geographic regions. Moreover the watch comprises means (18, 19, 20) operable by a user of the watch in order to furnish a code number to an electronic managing and control unit (22). This number, chosen among a plurality of numbers, forms a code corresponding to the geographic region in which the user is located. With the help of such code number, the electronic unit (22) can determine the mean magnetic azimuth corresponding to the region in which the user is located by means of a memory (26) in which is stored a plurality of mean magnetic azimuths respectively corresponding to said plurality of geographic regions.

6 Claims, 3 Drawing Sheets

WATCH COMPRISING AN ARRANGEMENT FOR INDICATING A PREDETERMINED GEOGRAPHIC LOCALITY

BACKGROUND OF THE INVENTION

The present invention concerns a watch comprising an arrangement for the indication of a predetermined geographic locality. In order to indicate the direction of a first predetermined geographic locality from any second geographic locality whatsoever, it is necessary to have available a geographic reference and to know the angle formed between such reference and the great circle passing through said first and second localities. By way of example, the predetermined geographic locality is Mecca.

For the reference, it is known to use a compass indicating the direction of the magnetic north. In this latter case, the direction of said first locality is given by the magnetic azimuth of such first locality relative to said second locality. Thus, an indicating arrangement of a predetermined locality from any second locality whatsoever taken amongst a plurality of defined localities must comprise means selectively furnishing the respective magnetic azimuth of said predetermined locality relative to said plurality of defined localities.

A purpose of the present invention is to furnish a watch comprising an arrangement for indicating the magnetic north and precise indicating means of a predetermined geographic locality from a plurality of geographic regions which can comprise a large number of regions.

Another purpose of the invention is to furnish such a watch arranged in a manner such that a user can easily know the direction of the said predetermined locality from any region whatsoever of said plurality of geographic regions.

SUMMARY OF THE INVENTION

The invention thus has as object a watch comprising:

an arrangement for detecting the terrestrial magnetic north, first means for indicating the direction of a predetermined locality from any geographic region whatsoever comprised within a first plurality of defined geographic regions, such watch being characterized in that it moreover comprises second electronic means arranged in order to determine the mean magnetic azimuth of said predetermined locality relative to any region whatsoever of said first plurality and third means for permitting a user to furnish selectively a number from among a second plurality of numbers to said second electronic means. The second means comprise a memory in which is stored a third plurality of mean magnetic azimuths of said predetermined locality respectively from said first plurality of geographic regions, said memory being addressed in a manner such that to each number of said second plurality there corresponds a respective magnetic azimuth of said third plurality, said first and second means being arranged in a manner to permit the indication of the direction corresponding to the mean magnetic azimuth of said predetermined locality from any one whatsoever of said geographical regions in which said user is located.

There results from the above-mentioned characteristics that the watch according to the invention can be used from a great number of regions, each of such regions being simply coded by a respective number which the user can furnish to the electronic means arranged for determining the corresponding magnetic azimuth. By a region, there is understood a locality, a city or a more or less vast region on the surface of the terrestrial globe.

According to a preferred embodiment, each of the numbers of said second plurality of numbers comprises the telephone calling code of the country in which is located the respective region of said first plurality.

According to a variant of the preferred embodiment, each of the numbers of said second plurality is formed by the telephone calling code of the country in which is located the respective region of said first plurality, followed by the telephone area code of such region.

There results from the characteristics of the preferred embodiment mentioned hereinabove that practically every inhabited place on the terrestrial globe can be identified with a given region in which such place is located. Thereafter, in the regions having a certain population density, each region corresponding to one and the same telephone area code has relatively small dimensions which assures good precision for the indication of the said predetermined locality.

Finally, it is generally easy for a user to know the telephone area code of the place in which he finds himself. Thus, without possessing the detailed and cumbersome correspondence table, a user can furnish from any place possessing a telephone network the code number permitting the electronic means to determine the corresponding magnetic azimuth, which is stored in an electronic memory of the watch according to the invention.

Other characteristics and advantages of the invention will be described hereinafter with the help of the following description prepared having reference to the annexed drawings given by way of non-limiting examples.

BRIEF DESCRIPTION THE DRAWINGS

DESCRIPTION OF THE PREFERRED EMBODIMENTS

Figure 1:
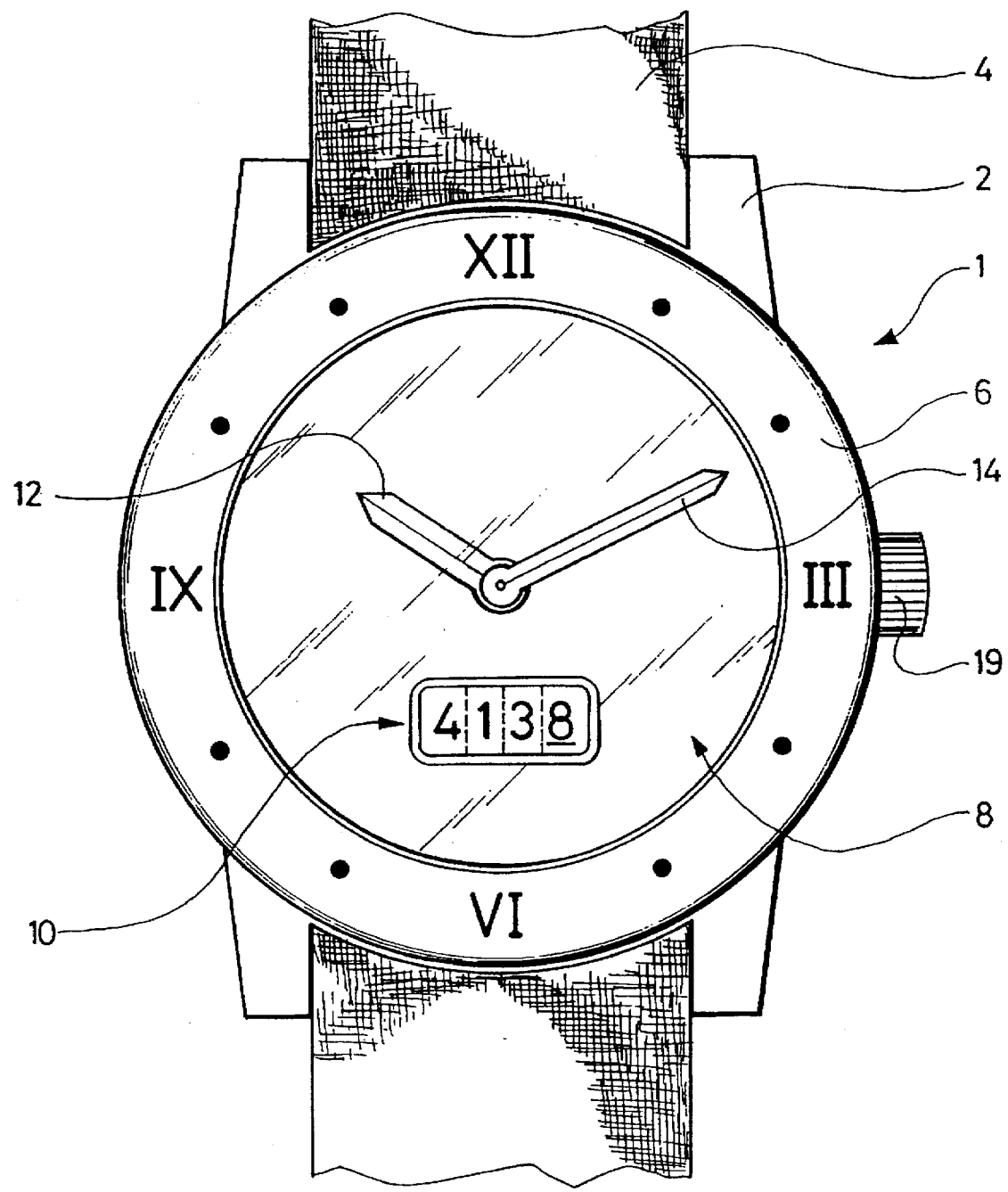
FIG. 1 is a general view from above of a watch according to a first embodiment.
Figure 2:
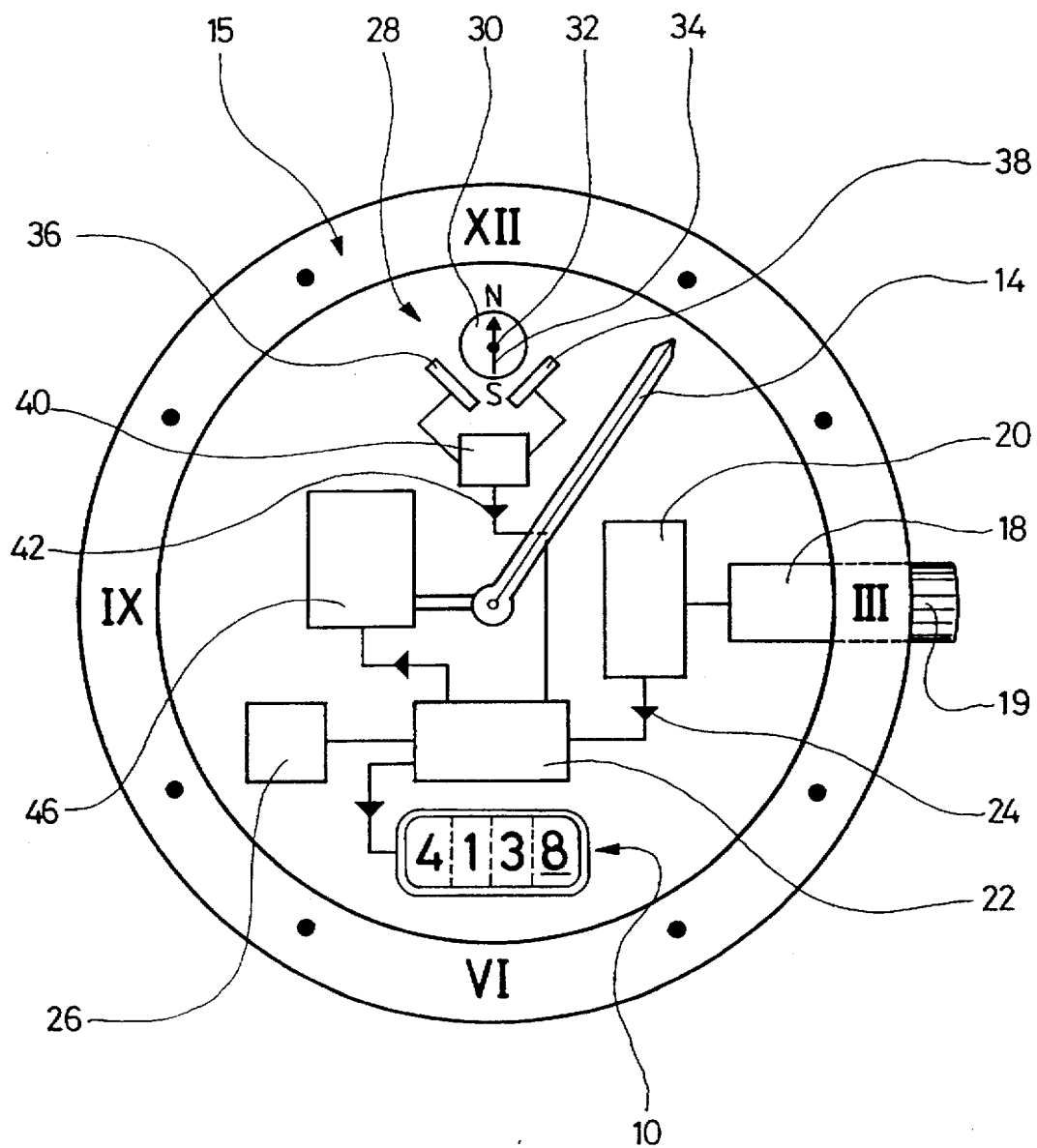
FIG. 2 is a schematic representation of the first embodiment.

In referring hereinafter to FIGS. 1 and 2, there will be described a first embodiment of a watch according to the invention.

Watch 1 is a wristwatch comprising a case 2 and a bracelet 4. Case 2 comprises in particular a bezel 6 and a dial 8 a zone of which is provided for a digital display 10. On bezel 6 are provided the hours indicia for the analog display of the time of day by means of hands 12 and 14.

Watch 1 comprises a control arrangement 18 fixed to a crown 19 operable by a user of the watch. The arrangement 18 is electrically associated with an electrical arrangement 20 in order to furnish an input signal 24 to an electronic management and control unit 22. Unit 22 is electrically coupled to the digital display 10 formed by a liquid crystal (LCD) display including four digits. If necessary, the number of digits may evidently be greater than four. The unit 22 is also coupled to an information storage unit 26, hereinafter referred to as "memory".

Unit 22 is also coupled to a mechanism 28 for detecting the direction of the terrestrial magnetic north comprising a permanent magnet 30 rotatably mounted on an axis 32. Magnet 30 is a bipolar magnet with radial magnetization.

Such magnet thus possesses a magnetic axis 34 perpendicular to the axis 32. The mechanism 28 also comprises two magnetic sensors 36 and 38 arranged to sense the magnetic flux from magnet 30 and to determine the direction of the magnetic axis 34. The two sensors 36 and 38 are coupled to an electronic unit 40 for processing electrical signals furnished respectively by the sensors 36 and 38. Unit 40 furnishes unit 22 with an electrical signal 42 representative of the direction of the magnetic axis 34 relative to a reference axis in the general plane of the watch corresponding to the plane of dial 8 located in such general plane. By way of example, such reference axis is formed by an axis 6 o'clock–12 o'clock fixed relative to case 2.

Finally, unit 22 is electrically coupled to an electromagnetic motor 46 mechanically coupled to hand 14. Unit 22 is arranged to control motor 46, in particular in an operational stepping mode known to persons skilled in the art.

The operation of the watch in a mode for indicating the direction of a predetermined locality and according to the first embodiment of the invention will be described hereinafter.

According to the invention, it is provided that a user of the watch can selectively furnish to the electronic unit 22 input signals respectively representative of a plurality of numbers. In order to accomplish this, unit 22 comprises a memory or an internal counter programmable by means of arrangements 18 and 20. The number corresponding to the electrical state of the internal counter can be displayed on display 10 in order that the user may know the state of such counter. Data introducing arrangements including arrangements 18 and 20 are known to the prior art, in particular from patent documents CH 632 894, CH 608 164 and EP 0 569 868.

The arrangements 18 and 20 and unit 22 are arranged in a manner such that it is possible to vary selectively each of the digits of the four digits of display 10 in order to form any number whatsoever selectable by a user. By way of example, the procedure to follow in order to select a number is as follows:

1) press on crown 19 during a time delay greater than three seconds, which has as effect to reset the internal counter of the unit 22 and also display 10 which then displays four zeros, the first of which is underlined or which blinks;

2) turn crown 19 in one or the other sense in order to increase or decrease the number of the first digit until the desired number appears;

3) press crown 19 which has as effect to activate the second digit in the selection mode;

4) turn crown 19 in order to select the number of the second digit;

5) proceed likewise for the third and fourth digits;

6) again, press crown 19 once the set of numbers of the four digits is selected, which will effect the storage of the selected number in the programmable memory or the internal counter of unit 22.

To each of the numbers selected by the user and comprised within a plurality of defined numbers, there corresponds a given geographic region. For each of such given geographic regions the person skilled in the art can determine the value of a mean magnetic azimuth corresponding to the direction of a predetermined locality. In memory 26 is stored a plurality of mean magnetic azimuths of the predetermined locality, in particular Mecca, respectively from a plurality of geographic regions coded by means of said plurality of numbers which are selectable by the watch user.

The memory 26 is thus addressed in a manner such that at each number of said plurality of numbers corresponds a respective magnetic azimuth the value of which can be furnished to unit 22 when such number is stored in said internal counter of unit 22.

With the help of the control signal 42 furnished by mechanism 28 and the value of the mean magnetic azimuth furnished by memory 26, unit 22 determines the angular position for hand 14 serving to indicate the direction relative to a reference axis of the watch 1, in particular the axis 6 o'clock–12 o'clock. Next, unit 22 is arranged to control motor 46 in a manner such that the latter angularly positions hand 14 in order to align such hand 14 with the direction of a predetermined locality, in particular of Mecca. In order to accomplish this, it is necessary that the initial position of hand 14 be known to unit 22 at the time of activation of an indicating mode for a predetermined locality. The temporal determination of the position of a hand in a watch is known to the person skilled in the art. Generally, a reset step is provided in order to locate the initial position of the hands after an interruption of the energization of the watch.

In the embodiment here described, it is provided that the plurality of numbers which are selectable by a user of the watch correspond to the respective telephone area codes of the plurality of geographic regions. In the variant shown on FIG. 1, each number which can be selected possesses four digits provided for the telephone calling code of the country, followed by the telephone area code of the concerned region. By way of example, number 4138 shown on FIG. 1 is made up of number 41 corresponding to the telephone calling code of Switzerland and number 38 corresponding to the telephone area code of the Neuchâtel region in Switzerland.

The coding by means of the telephone area codes is particularly astute and efficient. In every place possessing a telephone network, a user can know the code number enabling the indication of the position of the user to the electronic management and control unit 22.

Figure 3:
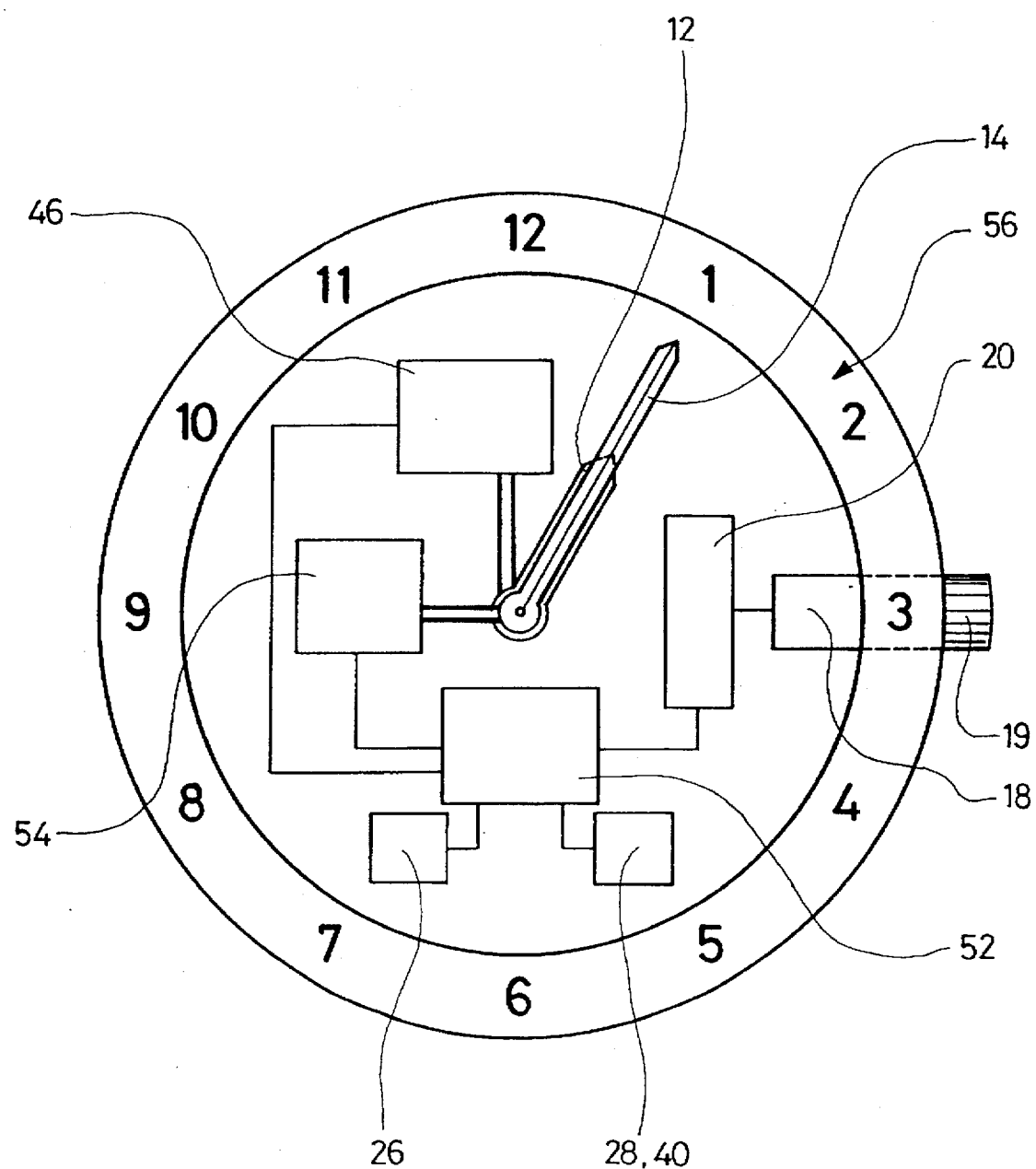
FIG. 3 is a schematic representation of a second embodiment of a watch according to the invention.

With the help of FIG. 3, there will be described briefly hereinafter a second embodiment of the invention. The references already described hereinbefore will not be again described here.

This second embodiment differs from the first embodiment in that the selection of the value of each digit making up the code number selectable by a user by means of arrangements 18 and 20 is effected by means of hands 12 and 14. When the watch is activated into a code number selection mode, the electronic management and control unit 52, similar to unit 22 of the first embodiment, controls electromagnetic motors 46 and 54 in a manner such that the two hands 12 and 14 are superposed onto one another in pointing to one of the digits 1 to 10 provided on the dial or the bezel of the watch case, schematically shown on FIG. 3 by ring 56. By one or several successive pressures on crown 19 fixed arrangement 18, hands 12 and 14 are aligned on any one of digits 1 to 10 serving for the hours indication. Index 10 indicating 10 o'clock corresponds to the digit 0 in the code number selection mode.

By way of example, the joint positioning of hands 12 and 14 over any one of numbers 1 to 10 is effected by means of short duration pressures on crown 19. Once the first digit is selected, there is effected a long duration duration pressure on crown 19 so as to store such digit in unit 52 and pass to the selection of a second digit making up the code number. The selection of each of the digits of the selected number by the user is effected in an equivalent manner.

Here it will be noted that in a variant of the embodiment a single hand can be used for the selection of the digits making up the code number, for example hand 12.

What I claim is:

1. A watch comprising a mechanism for detecting the direction of the terrestrial magnetic north, first means for indicating the direction of a predetermined locality from any geographic region whatsoever comprised within a first plurality of defined geographic regions, second electronic means arranged in order to provide the mean magnetic azimuth of said predetermined locality relative to any region whatsoever of said first plurality, and third means arranged so as to permit a user to furnish a telephone code number chosen from a second plurality of telephone code numbers to said second electronic means, said second means comprising a memory in which is directly stored a third plurality of mean magnetic azimuths of said predetermined locality respectively from said first plurality of geographic regions, said memory being addressed in a manner such that to each number of said second plurality there corresponds a respective stored magnetic azimuth of said third plurality, said first and second means being arranged in a manner to permit the indication, without any calculation by a microprocessor of said third plurality of mean magnetic azimuths, of the direction corresponding to the mean magnetic azimuth of said predetermined locality from any one whatsoever of said geographic regions in which said user is located.

2. A watch as set forth in claim 1, wherein each of said numbers of said second plurality comprises the telephone calling code of the country in which the respective geographic region of said first plurality is located.

3. A watch as set forth in claim 1, wherein each of said numbers of said second plurality is formed by the telephone calling code of the country in which the respective geographic region of said first plurality is located followed by the telephone area code of such region.

4. A watch as set forth in claim 1, said mechanism for detecting the direction of the terrestrial magnetic, north comprising a bipolar permanent magnet with radial magnetization, freely mounted on an axis and at least two magnetic sensors arranged so as to sense the magnetic flux of said magnet, said watch furthermore comprising fourth electronic means associated with said magnetic sensors in order to determine the angular position of the magnetic axis of said magnet, said fourth electronic means being associated with said second electronic means in order to control said first means in a manner such that these latter indicate a direction shifted angularly relative to said terrestrial north magnetic direction through an angle corresponding to a mean magnetic azimuth of said predetermined locality as selected by said user.

5. A watch as set forth in claim 1, said third means comprising a display device and an electrical arrangement associated with a control arrangement operable by said user, said electrical arrangement being adapted to furnish an input signal to said second means which controls said display device in a manner to permit such user to select any number whatsoever among said second plurality of numbers.

6. A watch as set forth in claim 5, said display device comprising at least one hand associated with fixed indicia representative of the digits zero to nine.

* * * * *